(12) United States Patent
Gu et al.

(10) Patent No.: US 6,814,857 B1
(45) Date of Patent: Nov. 9, 2004

(54) METHOD FOR PASSING A FLUID THROUGH A MOVING BED OF PARTICLES

(75) Inventors: Weikai Gu, Mount Prospect, IL (US); Paul A. Sechrist, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 456 days.

(21) Appl. No.: 10/062,689

(22) Filed: Jan. 31, 2002

(51) Int. Cl.$^7$ .............................................. C10G 35/04
(52) U.S. Cl. ...................... 208/134; 208/139; 208/146; 208/153; 208/171; 208/173; 208/165; 585/654; 585/921; 585/920; 422/139; 422/211; 422/216; 422/219
(58) Field of Search ................................ 208/139, 171, 208/134, 173, 146, 165, 153; 585/654, 921, 920; 422/139, 211, 216, 219

(56) References Cited

U.S. PATENT DOCUMENTS 4,110,081 A * 8/1978 Millar et al. ................. 422/213
4,478,793 A * 10/1984 Vickers ....................... 422/216

OTHER PUBLICATIONS

Carson, J.W. et al. "Characterize Bulk Solids to Ensure Smooth Flow" *Chemical Engineering*, Apr. 1994, pp. 78–90.

Marinelli, J. et al. "Solve Solids Flow Problems in Bins, Hoppers, and Feeders" *Chemical Engineering Progess*, May 1992, pp. 22–28.

Ginestra, J.C. et al. "Pinning of a bed of Particles in a Vertical Channel by a Cross Flow of Gas" *Ind. Eng. Chem. Fundam.* 1985, 24, pp. 121–128.

Jaeger, H.M. et al. "Physics of the Granular State" *Science*, vol. 255, No. 5051, Mar. 20, 1992, ISSN 0036–8075 pp. 1523–1531.

Savage, S.B. "Mechanics of Granular Materials—New Models and Constitutive Relations" *Studies in Applied Mechanics 7*, Elsevier Science Publishing Co., Inc., New York, 1982 pp. 261–282.

Glanz, J. "Hidden in the Hopper: A Secret of Physics" The New York Times, Jan. 9, 2001, section F, p. 3, column 1.

* cited by examiner

*Primary Examiner*—Walter D. Griffin
*Assistant Examiner*—James Arnold, Jr
(74) *Attorney, Agent, or Firm*—John G. Tolomei; Michael A. Moore

(57) ABSTRACT

A process for contacting a bed of particulate material, usually catalyst, with a transverse flow of fluid is disclosed. The particulate material moves or is prevented from not moving, while the fluid passes through the bed at a rate greater than the stagnant bed pinning flow rate. This invention is applicable to hydrocarbon conversion processes and allows for higher fluid throughput rates compared to prior art processes.

18 Claims, No Drawings

METHOD FOR PASSING A FLUID THROUGH A MOVING BED OF PARTICLES

FIELD OF THE INVENTION

This invention relates generally to the field of fluid-particle contact and more specifically to a method for operation of the moving beds of radial or horizontal flow fluid-solid contacting devices. More specifically, this invention is related to a method for the contacting of a hot fluid stream with particulate material in a particle bed from which particles are continuously or periodically added and withdrawn.

BACKGROUND OF THE INVENTION

A wide variety of processes use radial or horizontal flow reactors to effect the contact of a compact bed of particulate matter with a fluid and in particular a gaseous stream. These processes include hydrocarbon conversion, adsorption, and exhaust or flue gas treatment. In most of these processes, contact of the particulate material with the fluid decreases the effectiveness of the particulate material in accomplishing its attendant function. In order to maintain the effectiveness of the process, systems have been developed whereby particulate material is semi-continuously withdrawn from the contacting zone and replaced by fresh particulate material so that the horizontal flow of fluid material will constantly contact a compact bed of particulate material having a required degree of effectiveness. A moving bed system has the advantage of maintaining production while the catalyst is removed or replaced. Typical examples and arrangements for such systems can be found in U.S. Pat. Nos. 3,647,680; 3,692,496; and 3,706,536; the contents of each of which are hereby incorporated by reference. A good example of the way in which moving bed apparatus has been used for the contacting of fluids and solids is found in the field of petroleum and petrochemical processes especially in the field of hydrocarbon conversion reactions. Many hydrocarbon conversion processes can also be effected with a system for continuously moving catalyst particles as a compact column under gravity flow through one or more reactors having a horizontal flow of reactants. One such process is the dehydrogenation of paraffins as shown in U.S. Pat. No. 3,978,150, and another such process is the dehydrocyclodimerization of aliphatic hydrocarbons.

Another well-known hydrocarbon conversion process that uses a radial flow bed for the contact of solid catalyst particles with a vapor phase reactant stream is found in the reforming of naphtha boiling hydrocarbons. This process uses one or more reactors. Typically, the catalyst particles enter the top of a first reactor, flow downwardly as a compact column under gravity flow, and are transported out of the first reactor. In many cases, a second reactor is located either underneath or next to the first reactor. Catalyst particles again move through the second reactor as a compact column under gravity flow. After passing through the second reactor, the catalyst particles may pass through additional reactors before collection and transportation to a regeneration vessel for the restoration of the catalyst particles by the removal of coke and other hydrocarbon by-products that accumulate on the catalyst in the reaction zone.

In the reforming of hydrocarbons using the moving bed system, the reactants typically flow serially through the reactors. The reforming reaction is typically endothermic so the reactant stream is heated before each reactor to supply the necessary heat for the reaction. The reactants flow through each reactor in a substantially horizontal direction through the bed of catalyst. The catalyst particles in each reactor are typically retained between an inlet screen and an outlet screen that together form a vertical bed and allow the passage of vapor through the bed. In most cases the catalyst bed is arranged in an annular form so that the reactants flow radially through the catalyst bed.

Experience has shown that the horizontal flow of reactants through the bed of catalyst can interfere with the gravity flow removal of catalyst particles. This phenomenon is usually referred to as hang-up or pinning and it imposes a constraint on the design and operation of reactors with a horizontal flow of reactants. Catalyst pinning occurs when the frictional forces between catalyst particles and the outlet screen that resist the downward movement of the catalyst particles are greater than the gravitational forces acting to pull the catalyst particles downward. The frictional forces occur when the horizontal flow of vapor passes through the catalyst bed and the outlet screen. When pinning occurs, it traps catalyst particles against the outlet screen of the reactor bed and prevents the downward movement of the pinned catalyst particles. In a simple straight reactor bed, or an annular bed with an inward radial flow of vapors, pinning progresses from the face of the outlet screen and, as the vapor flow through the reactor bed increases, it proceeds out to the outer surface of the bed at which point the bed is described as being 100% pinned. Pinning between the outlet screen and the outer surface occurs when the frictional forces between catalyst particles that resist the downward movement of the catalyst particles are greater than the gravitational forces acting to pull the catalyst particles downward, thereby trapping catalyst particles against pinned catalyst particles. Once pinning has progressed to the outermost portion of the catalyst bed, a second phenomenon called void blowing begins. Void blowing describes the movement of the catalyst bed away from an inlet screen by the forces from the horizontal flow of vapor and the creation of a void between the inlet screen and an outer catalyst boundary. The existence of this void can allow catalyst particles to blow around or churn and create catalyst fines. Void blowing can also occur in an annular catalyst bed when vapor flows radially outward through the bed. With radially outward flow, void blowing occurs when the horizontal flow of vapor creates a void between the inner screen and the inner catalyst boundary. Therefore, high vapor flow can cause void blowing in any type of radial or horizontal flow bed.

The trapping of catalyst particles within a reactor bed that is designed to move continuously causes some catalyst particles to remain in the bed for a longer time than other catalyst particles that still move freely through the bed. As the trapped catalyst particles deactivate and thereby become less effective at promoting the desired catalytic reactions, the reactor bed as a whole exhibits a performance decline, which imposes a direct loss in the production of the desired product. In addition, the production of fines can pose a number of problems in a continuous moving bed design. The presence of catalyst fines increases the pressure drop across the catalyst bed thereby further contributing to the pinning and void blowing problems, can lead to plugging in fine screen surfaces, contributes to greater erosion of the process equipment, and in the case of expensive catalysts imposes a direct catalyst cost on the operation of the system. Further discussion of catalyst fines and the problems imposed thereby can be found in U.S. Pat. No. 3,825,116, which also describes an apparatus and method for fines removal.

Where possible, horizontal or radial flow reactors are designed and operated to avoid process conditions that will lead to pinning and void blowing. This is true in the case of moving bed and non-moving bed designs. Apparatus and methods of operation for avoiding or overcoming pinning and void blowing problems are shown in U.S. Pat. Nos. 4,135,886; 4,141,690; 4,250,018; and 4,567,023, the contents of each of which are incorporated herein by reference. To avoid process conditions that lead to pinning, it has been the practice for many years to operate reactors of continuous and semi-continuous moving bed designs by maintaining the flow of vapor through the bed of catalyst at a rate that is below the rate that will pin catalyst when the bed is stagnant. This rate is referred to herein as the stagnant bed pinning flow rate.

As explained in further detail in the detailed description below, the stagnant bed pinning flow rate is the fluid rate that prevents at least a portion of the particles in a bed, which is initially stagnant, from moving downward when particles are withdrawn from the bottom of the bed. In the past, the stagnant bed pinning flow rate has been estimated using a theoretical analysis of the mechanics within the stagnant bed of particles. A suitable analysis is described in the article written by J. C. Ginestra et al. at pp. 121–124 in Ind. Eng. Chem. Fundam. 1985, 24. The inputs to this analysis are the physical properties of the particles; the condition of the particle bed; the geometry of the particle bed and of the screens and walls retaining the bed; the physical properties of the screens and walls, if any, retaining the bed; the physical properties of the fluid; and the operating conditions of the bed. The condition of the particle bed takes into account the solid fraction of the particle bed, the particle-screen static friction factor, and the particle-particle static friction factor. Confirmation of this estimate of the stagnant bed pinning flow rate can be obtained by experiment. The experimental apparatus is a vertically-extended bed of particles between an inlet screen and an outlet screen, with an inlet at the top of the bed and an outlet at the bottom of the bed for downward flow of particles. The apparatus also has a fluid inlet and a fluid outlet for cross-flow of a fluid. While the particle outlet is closed, the particle bed is formed by introducing particles through the particle inlet in the same manner as particles are introduced through the inlet when particles are flowing downward through the bed. Only a short time after loading in order to ensure that the solid fraction of the particle bed is essentially the same as when the particles are loaded, the fluid flow rate through the bed of particles is started at a relatively high rate such that, once downward flow of particles begins, a substantial portion (i.e., about 25–50%) of the particles within the bed is pinned. Then, the particle inlet and outlet are opened, so that particles flow downward through the bed. Next, the flow rate is reduced stepwise, with each reduction in flow unpinning some of the particles that had been pinned, until the final downward step in flow rate results in no pinning of any of the particles. The stagnant bed pinning flow rate can be determined by averaging the penultimate and final flow rates. The precision of the measurement of the stagnant bed pinning flow rate can be improved by decreasing the step size between the penultimate and final flow rates.

Many moving bed design reactors in commercial plants around the world have operated for years and even decades at vapor rates below the stagnant bed pinning flow rate described in the preceding paragraph and thereby have successfully avoided any pinning problems. Despite thousands of successful plant-years of operation, catalyst pinning, although rare, can occasionally occur in a radial flow reactor of the continuous or semi-continuous moving bed design. When pinning does occur, a short procedure is typically used to "unpin" any pinned catalyst. First, the vapor flow rate is decreased significantly below, i.e., typically at least 10–50% below, the stagnant bed pinning flow rate, and then the flow rate is increased to a rate which is less than the stagnant bed pinning flow rate. The catalyst withdrawal rate may be stopped or decreased, either before, simultaneously with, or after the reduction in vapor rate. If the catalyst withdrawal is stopped or decreased, then it is usually restarted or increased prior to increasing the vapor flow rate. In cases of severe pinning where this short procedure is unsuccessful, the vapor flow is stopped and the pinned catalyst is manually removed from the bed.

Occasionally, commercial reactor beds that are designed to move continuously stop moving and come temporarily to rest. This happens intentionally when the reactor bed is designed for semi-continuous catalyst withdrawal. Depending on the design and operation of the commercial plant, these periods of time at rest can be in the range of from as low as 1–2 minutes to as high as 6–12 months, but they are commonly in the range between 10 minutes and 1 hour. When catalyst flow is resumed, catalyst in these reactor beds does not become pinned, as evidenced by the absence of any symptoms of pinning.

Methods of operation for increasing the vapor flow rate in moving bed processes while avoiding pinning problems are sought.

BRIEF SUMMARY OF THE INVENTION

In a surprising discovery, it has now been recognized for the first time that, when a fluid flows transversely through a moving particle bed and is recovered from a perforated outlet partition, the duration of time during which the particle bed has been at rest can significantly affect whether or not particles pin against the outlet partition. Although this effect has been observed in beds containing cohesionless particles, this discovery is believed to be also applicable to particles that exhibit some cohesion. Exploiting this unexpected discovery, this invention is a process for passing a fluid through a bed of particles at a rate greater than the previously-defined stagnant bed pinning flow rate, which is the upper limit on fluid flow rate in the prior art processes. By keeping the particles moving or by decreasing, or keeping at a minimum, their time at rest, this invention permits fluid to pass through the particle bed at flow rates far above the stagnant bed pinning flow rate. If the particles do come to rest while the fluid flow rate exceeds the stagnant bed pinning flow rate, then according to this invention the duration of the time at rest is limited either to a specified period of time or to a period of time during which the solid fraction increases by only a specified amount. Of the particles in the bed, those that should move or should be prevented from not moving in accord with this invention are those particles that are closest to the outlet screen, since pinning generally progresses from the outlet screen. However, a process in which all of the particles in the bed keep moving is within the scope of this invention. In any event, by allowing particle beds to operate at fluid throughputs outside the constraints imposed by the prior art, this invention significantly increases the efficiency and profitability of processes that use new and existing particle beds.

The present discoveries show that, for a given particulate material maintained in a bed of a given geometry, the pinning flow rate when the bed is moving (i.e., the moving bed pinning flow rate) is significantly greater than the stagnant bed pinning flow rate. As explained in further detail in the detailed description below, the moving bed pinning flow rate is the fluid rate that prevents some of the particles in a bed, which is initially moving, from moving downward when particles are withdrawn from the bottom of the bed. Experimental results show that the moving bed pinning flow rate can be up to 60% higher than stagnant bed pinning flow rates, depending on the bed configuration, particulate material, and process conditions. This unexpected discovery led to the present invention, which is a dramatic breakthrough process in the sense that this invention shatters preexisting notions about processing barriers. This invention surpasses hydraulic constraints that had previously been considered insurmountable. In contrast to the prior art which viewed the stagnant bed pinning flow rate as a limit on the flow rate of reactants through a bed of particulate material, this invention allows for flow rates of reactants through the bed that exceed the stagnant bed pinning rate and which approach the moving bed pinning flow rate. In theory, by using this invention, the flow rate of reactants through the bed can be increased by a factor equal to the ratio of the moving bed pinning flow rate to the stagnant bed pinning flow rate. In practice, the reactant flow rate will be increased by less than that factor, and will typically increase in the range of about 15% to about 60% of the reactant flow rate in the prior art processes. Nevertheless the economic and technical benefits that accrue from even a 1% increase in the flow rate of reactants through an existing particular bed are enormous.

Without being bound by any particular theory, it is believed that the explanation why the fluid flow rate can be increased while avoiding pinning problems is that the particle-screen screen friction is significantly less when the particulate material is moving relative to the screen than when the particulate material is stagnant relative to the screen, and therefore pinning decreases. The particle-screen friction is caused by particles contacting the screen and is expressed by the particle-screen friction factor. The particle-screen kinematic friction factor expresses the friction caused by particles moving or sliding against the screen, whereas the particle-screen static friction factor expresses the friction between particles and the screen when the particles and the screen are not moving relative to each other. The particle-screen friction is significantly lower not only because the solid fraction in the bed decreases but also because the particle-screen kinematic friction factor itself decreases. In addition to the belief that the particle-screen kinematic friction factor decreases relative to the particle-screen static friction factor, it is also believed that the particle-screen kinematic friction factor is only very weakly dependent on the flow rate of the particulate material. So, as long as the particulate material is moving or sliding to any extent along the screen, it is believed that the particle-screen kinematic friction factor remains significantly less than the particle-screen static friction factor. Thus, the critical characteristic of moving or sliding particles along the screen in this invention is not how fast they are moving, but that they are in fact moving.

Similarly, it is also believed, without being bound by any particular theory, that the particle-particle kinematic friction factor is significantly less than the particle-particle static friction factor, and also that the particle-particle kinematic friction factor is only very weakly dependent on the flow rate of the particulate material across the screen. The particle-particle static friction factor expresses the friction between solid particles that are not moving against each other, and the particle-particle kinematic friction factor expresses the friction caused by particles flowing against each other. While the particle-screen friction is an important factor in the onset of pinning at the outlet screen, the particle-particle friction is an important factor in determining the extent and shape of the volume of pinned particles in the bed.

It has also now been recognized, as a result of this invention, that for many new moving-bed commercial processes, a semi-continuous moving bed design in which the bed is at rest for long periods of time may not be optimum from a process economics viewpoint. In most cases, the capital that would be invested in equipment and control systems for a semi-continuous moving bed design would yield a much greater return if invested instead on the equipment and systems for a continuous moving bed design, because the continuous moving bed design allows for a significant increase in processing throughput through an existing particle bed process, which leads to greater profitability. Investing capital in a revamp of an existing semi-continuous moving bed processes into a continuous process will also yield a high return on investment.

In addition, this invention provides a method for unpinning particles in a particle bed. First, and optionally, the addition and withdrawal of particles to and from the bed is stopped. Then, the fluid flow rate is decreased to a rate that is less than the stagnant bed pinning flow rate of the bed. Finally, if the particle flow to and from the bed was stopped, then the particle flow is resumed.

This invention also provides a method of raising the fluid flow rate through the bed to a rate that is more than the stagnant bed pinning flow rate. Initially, the fluid flow rate is less than the stagnant bed pinning flow rate, and then the addition and withdrawal of particles to and from the bed is begun. Finally, the fluid flow rate is increased to a rate above the stagnant bed pinning flow rate.

This invention stands in stark contrast to prior art fluid-particle contacting processes. Embodiments of this invention that keep the particles moving differ from two prior art processes, namely those processes where the particles move only when the fluid rate is less than the stagnant bed pinning flow rate and those processes where the particles are not moving when the fluid rate exceeds the stagnant bed pinning flow rate. Embodiments of this invention that regulate the time during which the particles are not moving when the fluid rate is greater than the stagnant bed pinning flow rate differ from the prior art process in which the particles do not move at all while the fluid rate is greater than the stagnant bed pinning flow rate. Such embodiments are also different from the prior art process in which the particles move at times and do not move at other times, but the fluid rate is less than the stagnant bed pinning flow rate.

In a broad embodiment, this invention is a process for passing a fluid through a bed of particulate material. A particulate material is maintained in a vertically extended bed having a fluid inlet face. The bed is maintained between the fluid inlet face and an outlet partition that has a perforated section extending over at least part of its length. The size of the perforations retains the particulate material while permitting fluid flow through the perforations. The particulate material is withdrawn from the bottom of the bed. An inlet fluid passes to the fluid inlet face and transversely through the bed. An outlet fluid is recovered from the perforated section of the outlet partition at an operating flow rate that is not less than a stagnant bed pinning flow rate. In another embodiment, the particulate material in the bed is prevented from coming to rest for a period of time.

Other objects, embodiments and details of this invention are disclosed in the following detailed description.

INFORMATION DISCLOSURE

The article written by J. W. Carson et al. at pp. 78–90 in Chemical Engineering, April 1994, which is incorporated herein by reference and hereinafter referred to as "Carson," teaches that, in the field of bulk solids handling in bins, hoppers, and feeders, the time that a bulk solid is stored at rest can affect the flow behavior of the bulk solid, since time of storage at rest can determine in part the cohesiveness and the frictional properties of a bulk solid. Carson teaches that, when a material resides in a bin or hopper for a period without moving, it can become more cohesive and difficult to handle, and that such cohesion may be caused by settling and compaction, crystallization, chemical reactions, and adhesive bonding.

The article written by J. Marinelli et al. at pp. 22–28 in Chemical Engineering Progress, May 1992, which is incorporated herein by reference and hereinafter referred to as "Marinelli," teaches that the time that a bulk material is at rest can influence the wall friction and can affect the determination of the size of the outlet of a bin or hopper.

The article written by J. C. Ginestra et al. at pp. 121–124 in Ind. Eng. Chem. Fundam. 1985, 24, analyzes the mechanics of pinning of a bed of particles in a vertical channel by a cross flow of gas.

The paper written by S. B. Savage, which is published at pp. 261–282, in the book entitled *Mechanics of Granular Materials—New Models and Constitutive Relations*, edited by J. T. Jenkins et al., Studies in Applied Mechanics 7, Elsevier Science Publishing Co., Inc. New York, 1982, reviews and discusses models that have been applied to predict the flows of dry, cohesionless granular materials down inclined surfaces.

The paper written by H. J. Jaeger et al. at pp. 1523–1531 in Science, Vol. 255, Mar. 20, 1992, describes inhomogeneity, maximum and minimum packing densities, and stress-carrying networks in particle beds.

The article entitled, "Hidden in the Hopper: A Secret of Physics," written by James Glanz and published in The New York Times, Jan. 9, 2001, section F, page 3, column 1, describes the difficulties that research physicists have had in devising a theory of "jamming" of granular materials in hoppers that takes into account the "nasty realities" of industrial practice, such as the effects of friction between particles of the granular material, humidity, other atmospheric conditions, and three-dimensional flow patterns.

DETAILED DESCRIPTION OF THE INVENTION

The fluid-particle contacting process of this invention can be applied to any type and form of bulk solid. A bulk solid is a particulate material comprising particles. Bulk solids include a large class of materials, including coal, ores, minerals, chemicals, catalysts, cereals, grains, plastics, which exist in a large number of different particle forms, including powders, granules, flakes, chips, crystals, and agglomerates, and in a large number of particle shapes, including round, angular, spherical, cylindrical, and irregular. See, for example, Table 21–4 on p. 21–6 in *Perry's Chemical Engineers' Handbook*, 7$^{th}$ Edition, edited by R. H. Perry et al., McGraw-Hill Book Co., New York, N.Y., USA, 1997, hereinafter referred to as "Perry." The particles may be formed either by size reduction or enlargement processes, such as those described generally in Sections 17 and 20 in Perry. Particles containing, for example, alumina or silica can be formed by spray processes such as spray drying, which produces particles of irregular shapes in a distribution of sizes. Spheres of gamma alumina may be produced by the well-known oil drop method, which is described in U.S. Pat. No. 2,620,314.

The particles preferably have good flowability characteristics. A person of ordinary skill in the art of conveying bulk solids can select particles having properties which are known to help ensure smooth particle flow. For example, Carson teaches parameters of bulk solids which are useful for predicting flow behavior of bulk solids and which are believed to be relevant to the suitability of particles for use in this invention. These parameters include cohesive strength, frictional properties, sliding at impact points, compressibility, permeability, segregation tendency, friability, abrasiveness, and pneumatic-conveying characteristics.

The cohesive strength of the particles is preferably minimized, and more preferably the particles are cohesionless, because the fluid rate that pins particles decreases as the cohesive strength of the particles increases. As used herein, particles are "cohesionless" if, when two particles are placed together and then separated by force, the force required for separation is zero Newton. Many commercial catalysts used in commercial moving bed processes have negligible attractive force between particles and may be considered "cohesionless." However, it is believed that particles that exhibit some cohesive strength may also be suitable for use in this invention. Carson teaches that the cohesive strength is a function of several characteristics, including moisture, particle size and shape, temperature, time of storage at rest, and chemical additives. In addition, it is believed that particles which have a relatively high Young's modulus (i.e., which exhibit less strain) under compressive stress tend to have lower cohesive strength. Preferably the sizes of the particles in the particulate material are uniform, but where the sizes of the particles are not uniform, then the size distribution may affect cohesive strength, since the particles may segregate or smaller particles may fill voids between larger particles. Particles that have an average size of less than half of the average size of all the particles comprise generally less than 1 wt-%, preferably less than 0.1 wt-%, more preferably less than 0.01 wt-%, even more preferably less than 0.001 wt-%, and still more preferably less than 0.0001 wt-%, of all the particles. Finally, it is believed that the density of the particles, if increased by consolidation pressure, can also increase cohesive strength.

The particles may be catalysts in a reaction zone in which a reactant fluid contacts the catalytic particles. Solid catalysts are widely used, and most solid catalysts are used as porous particles in a bed of particles. Suitable solid catalysts may include acids, bases, metal oxides, metal sulfides, metal hydrides, metals, alloys, and transition-metal organometallic catalysts. Solid catalysts are selected primarily for their activity, selectivity, and stability with respect to a particular reaction. Perry describes catalysis by solids at pages 23–26 to 23–29 and pp. 23–36 to 23–38, the teachings of which are incorporated herein by reference.

The fluid-particle contacting process of this invention can be applied to any form of moving bed wherein the particulate material flows downward in a compact bed and fluid contacts the particles by transverse movement through the compact bed. The terms "compact bed" or "compact column" of particulate material refer to a state wherein the particles rest on top of each other whether moving or stationary—as opposed to a fluidized bed where gas flow creates lift on the particles to create void spaces between the particles in a fluidized movement of particles.

The method of this invention is particularly adapted for the radial or cross flow of a fluid through the bed of particles. The bed of particles is typically maintained as a relatively thin and vertically extended layer of particles through which the fluid passes transversely. The thickness of the bed over its height may also vary and is advantageously in some regeneration processes arranged to increase down the length of the bed. The particle pathways in the bed have a vertical downward component. Although the particle pathways may have a horizontal component, preferably they do not. The fluid streamlines in the bed have a horizontal component and may have a vertical component, and if present the vertical component may be upward but is preferably downward. If the particle pathways have a horizontal component, that component is usually in the direction of the horizontal component of the fluid streamlines.

The bed of particles, in its most general arrangement, has a fluid inlet face through which fluid enters the bed, and the bed is maintained between the fluid inlet face and an outlet perforated partition. The fluid entering the bed can be distributed across the fluid inlet face of the bed by an inlet perforated partition, by the fluid inlet face and a suitable depth of particles, or by both. Without an inlet perforated partition, the shape of the fluid inlet face of the bed of particles is determined by factors including gravity, the angle of repose of the particles, how the bed was formed, the flowability of the particles, operating conditions, and the composition and flow rate of the fluid. Although the fluid inlet face is preferably vertically extended, the fluid inlet face may be horizontally extended. An embodiment of this invention using a horizontally-extended fluid inlet face comprises introducing both fluid and particles to the top of the vertically extended bed, passing the particles downward through the bed and withdrawing them from the bottom of the bed, and withdrawing fluid from the side of the bed. In this embodiment, the flow direction of fluid changes within the bed from vertically downward to horizontal, and thus within the bed the fluid passes transversely at least at some point within the bed.

In embodiments of this invention where particles are used to distribute the fluid entering the bed, such as those without an inlet perforated partition, the single bed can function as if there were two sub-beds through which fluid passes in series. In the first sub-bed, the fluid is distributed, and in the second sub-bed the fluid contacts the particles. In this embodiment, the fluid inlet face is that of the second sub-bed, which is within the single bed.

The surface of the bed of particles may have a flat shape, as in the case of a bed having the form of, for example, a cube, a rectangular parallelepiped, a prism, or a frustum of a pyramid. But in most cases the surface of the bed is curved and the bed itself is arranged in an annular form by inner and outer perforated partition elements. A preferred embodiment of this invention is a process for contacting a reactant fluid with catalytic particles in a reaction zone which uses screens to contain the catalyst particles in a configuration while the reactant fluid passes radially—either inwardly or outwardly—through the bed. The terms "inlet screen" and "outlet screen" are used generally to describe any type of perforated element that may distribute or collect the fluid while containing, or retaining, the catalyst particles in a confined space. Suitable screen elements consisting of profile wire or other perforated members are well known to those skilled in the art. Another preferred form of distributing the fluid and providing a containment space is using extended conduits that have a scalloped shaped profile and are commonly referred to as "scallops".

The construction, material, and surface condition of each screen, especially of the outlet screen, preferably minimize friction between particles and the screen. A person of ordinary skill in the art of screen technology can select a screen that minimizes this friction and whose friction will not increase during service due to corrosion or roughening or abrasive wear. Marinelli teaches factors which influence friction between a bulk solid and the wall of a hopper or bin and which are believed to be relevant to the suitability of screens for use in this invention. These parameters include cohesive strength, frictional properties, sliding at impact points, compressibility, permeability, segregation tendency, friability, abrasiveness, and pneumatic-conveying characteristics. The angle between each screen surface and the horizontal may be from 45 to 135°, but is preferably 90°. The angle that one screen surface makes with the horizontal may be slightly more or less than that of another screen surface in the case of a tapered bed whose thickness varies over its length.

The arrangement of the bed of particles, the inlet perforated partition, and the outlet perforated partition preferably ensures uniform flow of the fluid through the bed of particles. The flux of fluid (i.e., the quotient of the fluid flow rate through a given area of the face of the outlet screen divided by the face area of the outlet screen) through any square foot of face area of the outlet screen is generally within 5%, and preferably within 1%, of the average flux of all the fluid flowing through the entire face area of the outlet screen. A preferred arrangement of the bed and the partitions is disclosed generally in the U.S. Pat. No. 4,567,023, and particularly at column 8, line 46 to column 9, line 40. Accordingly, the velocity head of the fluid stream in an inlet manifold defined in part by the inner screen and the velocity head of the fluid stream in an outlet manifold defined in part by the outer screen are balanced, as described in U.S. Pat. No. 4,567,023. Preferably, the velocity head of the fluid stream at the lower terminal end of the inlet manifold is 0, and the velocity head of the fluid stream at the lower terminal portion of the outlet manifold is substantially 0. Another arrangement of the bed and partitions is described in U.S. Pat. No. 3,706,536.

The bed of particles has a solid fraction, which is the volumetric fraction of the total bed volume that is occupied by the solid particles. Solid fraction, as used herein, equals one minus the void fraction. Void fraction refers to the volume fraction of the bed of particles that is occupied by the void spaces between the particles and excludes volume within the pores of the particles. The recognition that solid fraction is an important parameter in determining whether or not particles in a bed pin is one of the important discoveries that led to this invention. Unexpectedly, it has been discovered that as the solid fraction increases, the tendency of the bed to pin at a given fluid rate increases. For particles having a uniform size, the solid fraction for a moving bed is generally from about 0.57 to about 0.72, and more typically from about 0.60 to about 0.65. As a general rule, the solid fraction for a stagnant bed is greater than that for the same bed when its particles are moving. At a given point in a particle bed, the decrease in solid fraction that occurs when a stagnant bed starts moving is usually relatively large compared to any further decreases that occur when the downward particle velocity increases in an already-moving bed.

The void spaces between particles, even in a compact bed wherein the particles rest on top of each other, can increase or decrease in size. Generally, the solid fraction of a bed depends on several factors, including the manner in which the particle bed was formed, the velocity distribution of the particles, the size distribution of the particles, whether or not the bed has been or is being vibrated, and whether or not a fluid passes through the bed of particles. If a fluid passes through the bed of particles, the composition, flow rate, and operating conditions of that fluid are also factors. In stagnant compact particle beds, another factor is the time at rest for the nonmoving particles, because the solid fraction increases as the time that the particles are at rest increases. Since these factors may be different in different regions of a particle bed, the solid fraction in the bed may not be identical in all regions of the particle bed. For example, in a vertically-extended particle bed, the solid fraction at a given vertical elevation may vary over the cross-section of the bed. Also, the solid fraction may be different at different vertical heights of the bed. Variation in the solid fraction of a moving bed with height can occur if the cross-sectional area of the bed varies with height, since the solid fraction will be relatively high when the cross-sectional area is relatively high and the particle velocity is relatively low, even if the particle flow rate is the same at each elevation throughout the bed.

The solid fraction of a bed can be determined in three ways. First, the solid fraction can be computed by dividing the bed density by the particle density. The bed density is the density of the particle bed and equals the weight of particles in the bed divided by the volume of the bed, and the particle density is the weight of a particle divided by the volume of the particle. Second, for at least some particle beds, the solid fraction of a particle bed can be determined from measurements of the electrical capacitance of the particle bed using one or more capacitance probes that are immersed in the particle bed.

A third way of determining the solid fraction of a particle bed is by pressure drop. If a fluid passes through the bed of particles, the solid fraction in a bed can be determined by measuring the pressure drop along a fluid streamline across or in the bed of particles and then computing the solid fraction of the bed of particles using the Ergun equation, which relates the pressure drop to the solid fraction. See Equation 6–166 on p. 6–38 in Perry. Assuming turbulent fluid flow and that all other conditions within the bed are constant, then the following formula is an adequate approximation of the relationship between pressure drop ($\Delta P$), the fluid superficial velocity (V), and the solid fraction (e):

$$\Delta P = (K)(V^2)(e)/(1-e)^3,$$

where K is a constant. Based on this formula, it is apparent that, at a constant superficial velocity, an increase in e from 0.56 to 0.58 increases $\Delta P$ by 19%, a change which can be easily measured by conventional differential pressure instrumentation. Therefore, monitoring the pressure drop across a bed of particles at a constant superficial velocity permits detecting even small changes in solid fraction within the bed of particles. However, it should be pointed out that this formula determines an average solid fraction for the bed of particles as a whole, but in fact the solid fraction may not be uniform throughout the bed, and some regions within the bed may have solid fractions which are higher or lower than the average solid fraction.

To determine the solid fraction of a stagnant bed of particles using the formula in the preceding paragraph, pressure drops are measured when the bed is stagnant for at least two, and preferably about ten, different superficial velocities. From these data, the value of K can be determined by averaging or by a least-squares analysis, and then the value of e for the stagnant bed can be determined. To determine the solid fraction of a moving bed of particles, the pressure drop is measured when the bed is moving for at least one superficial velocity, and preferably for about five superficial velocities. Except for the facts that the superficial velocities may be different and that the bed is moving, all other operating and measuring conditions of the bed are the same as during the determination of the solid fraction of the stagnant bed. Thus, the value of K determined from the measurements while the bed was stagnant is directly applicable to the measurements made while the bed is moving, so that the solid fraction for the moving bed can be determined from the pressure drop(s) obtained from the moving bed measurements. From this description of the use of the above formula, it should be apparent to a person of ordinary skill in the art that the value of K can also be determined using measurements of a moving bed rather than those of a stagnant bed.

It is important in the present invention that, when the fluid rate exceeds the stagnant bed pinning flow rate, that the particles are kept moving or that the time during which the particles are at rest is regulated within prescribed limits. The stagnant bed pinning flow rate is defined as the fluid rate that prevents at least a portion of the particles in a bed, which is initially stagnant, from moving downward when particles are withdrawn from the bottom of the bed. It is assumed that the configuration of the particle bed is such that, when no fluid passes through the bed, at least a portion of the particles in the bed may move downward within the bed when particles are withdrawn from the bottom of the bed by opening the particle outlet. The flow rate of the fluid is in excess of the stagnant bed pinning flow rate when at least a portion of the particles that were able to move downward when no fluid passed through the bed cannot move downward when the fluid is passing through the bed. That is, but for the flow rate of the fluid being in excess of the stagnant bed pinning flow rate, the particles in the bed that could move downward when the bed was initially stagnant and the particle outlet was opened are unable to move downward, despite the fact that the particle outlet is opened.

As used herein, keeping the particles moving means that the particles are always moving in a downward direction, even if the velocity of movement in the downward direction is relatively small. Movement of particles in the downward direction in one portion of the bed can generally be achieved by withdrawing particles from a lower portion of the bed, usually from the bottom of the compact bed, which in turn allows particles higher in the bed to move downward because the particles in the bed rest on top of each other even when moving. It is recognized that, even when the particles are not being withdrawn from a lower portion of the compact bed, that some movement of the particles may occur by forces other than those which are present only when particles are being withdrawn from below. Those other forces include vibration, settling, compaction, thermal expansion, or thermal contraction of the particle bed. It is believed that movement due to any these phenomena individually or even in combination, in the absence of withdrawal of particles from a lower portion of the bed, is insufficient movement for purposes of this invention.

In embodiments of this invention that keep the particles moving, the minimum downward component of the velocity of the particles for any specific fluid-particle contacting process depends on many factors that are specific to that particular process. In these embodiments, the minimum downward velocity is greater than zero, of course. But, since this invention has general applicability to any fluid-solid contacting process, it is not practical to list herein all of the factors that can affect the minimum downward velocity for all possible processes in which this invention can be used, or to specify definite minimum velocities for any particular process. For example, and because this invention is generally applicable to hydrocarbon conversion processes catalyzed by solid catalyst particles, the factors for two hydrocarbon conversion processes—catalytic dehydrogenation and catalytic reforming—are presented here. In these processes, the factors include the composition and properties of hydrocarbon feed; operating conditions including temperature, pressure, and space velocity; catalyst physical properties including size, friction properties, and cohesiveness; nature of the reactions that take place in, on, and outside of the catalyst; shape, dimensions, and configuration of the catalyst bed; residence time of catalyst in the catalyst bed; catalyst performance including its activity, selectivity to products and byproducts, and its deactivation rate and mechanism; and the particle handling capacities of the equipment that supplies particles to the bed and of that which withdraws particles from the bed. However, a person of ordinary skill in the art can determine a suitable minimum velocity of particles for any given particle bed by monitoring the operating conditions of the particle bed in response to different particle velocities. It is believed that the minimum downward component of the particle velocity is generally greater than 0.02 mm/min, typically greater than 0.2 mm/min, and more typically greater than 2.0 mm/min, and in some instances the particles are maintained at least at 20 mm/min.

It is also within the scope of this invention to regulate the time during which the particles are at rest within prescribed time limits. That is, processes in which at times the particles are not moving downward are nevertheless within the scope of this invention, provided that, within a specified period of time the downward movement of particles is resumed. As used herein, the term "at rest," means that the downward component of the velocity of the particles is zero. Particles that are "at rest" are sometimes referred to herein as being "stagnant." Stopping movement of particles in the downward direction in one portion of the bed can generally be achieved by stopping the withdrawal of particles from a lower portion of the bed, such as from the bottom of the compact bed, which prevents particles higher in the bed from moving downward because they rest on particles lower in the bed. As previously mentioned, some movement of particles in the bed may occur even when particles are not being withdrawn from below, due to previously mentioned phenomena including settling within the bed. Since the velocity of any such movement is small, particles that move only because of one or more of these phenomena—alone or in combination—in the absence of withdrawal of particles from a lower portion of the bed, have for purposes of this invention, zero downward velocity.

In embodiments of this invention in which the particles are alternately at rest for a period of time and then moving for a period of time, the duration of the at-rest time period must be non-zero, but the maximum duration of this stagnant time period for any specific fluid-particle contacting process depends on many factors that are specific to the particular process. These factors include the same list of factors previously listed as affecting the minimum downward velocity. For this reason, it is not possible to specify a definite maximum duration of time for any particular process, including hydrocarbon conversion processes. However, a person of ordinary skill in the art can determine a suitable time period of being at rest for any given particle bed by monitoring the operating conditions of the particle bed in response to changes in the time of stoppage of the particle flow. It is believed that the maximum duration of time that the downward velocity is zero is generally less than about 72 hr, typically less than about 24 hr, and more typically less than about 1 hr. The particles should be prevented from being at rest for a period of more than 72 hr generally, 24 hr typically, and 1 hr more typically. However, for some particles and some processes, the maximum time at rest may be very short indeed, and it is expected that in some processes, this time may be in the range of from about 1 sec to about 1 hr, more usually between about 1 min and about 30 min, and even more typically between about 5 min and about 20 min. Particles in processes such as these should be prevented from being at rest for a period of more than 1 hr generally, 30 min usually, and 5 min more typically. Because the solid fraction increases as the time at rest increases, the time at rest should be sufficiently short that the solid fraction in the bed increases by less than 0.04 generally, 0.02 preferably, and 0.01 more preferably.

Where the particles are alternately at rest for a period of time and then moving for a period of time, the magnitude of the downward component of the average particle velocity is generally greater than 0.02 mm/min, typically greater than 0.2 mm/min, and more typically greater than 2.0 mm/min, and in some instances the particles are maintained at least at 20 mm/min.

The particles which keep moving or which are alternately at rest and moving comprise, in one embodiment of this invention, all of the particles in the particle bed. In this embodiment, the particles in the particle bed move downward in a mass-flow pattern, such as that described in Marinelli for flow in bins and hoppers, rather than in a funnel-flow pattern such as ratholing. Although Marinelli is not directed to cross-flow of gas through downflowing solids and even though Marinelli states that solid/gas interactions are very complex and often counterintuitive, it is believed that a person of ordinary skill can design a particle bed configuration in which vapor flows cross-wise and which is designed to ensure that, if some of the particles in the bed move downward, then most if not all of the other particles in the bed move downward also. U.S. Pat. No. 4,567,023, for example, describes a multiple stage reactor system in which allows little if any stagnation of catalyst by using an annular-form catalyst collecting zone at the bottom of the particle bed and by removing the reactant stream from the top of the outlet screen. However, it is not a requirement of this invention that all of the particles in the particle bed move downward when particles are withdrawn from the bottom of the particle bed. Some particles may remain stagnant in the particle bed for reasons other than pinning, because of factors similar to those described in Marinelli, including, for instance, the steepness and smoothness of the screens and walls which contain the particle bed. In some embodiments of this invention, particles that are relatively far from the outlet screen, may not move at all when particles are withdrawn from the bed, and these particles are sometimes referred to as "heel particles" or, in the case of catalytic particles, "heel catalyst." Generally, however, particles that are relatively near to the outlet screen move. Particles that move include those that are within a distance from the outlet screen of generally from about 0 to about 2, commonly from about 0 to about 5, and more commonly from about 0 to about 10, nominal particle diameters. Expressed in terms of a percentage of the distance from the outlet screen to the fluid inlet face of the particle bed, the particles that move are generally from about 0 to about 1%, commonly from about 0 to about 5%, and more commonly from about 0 to about 10%, of the distance. Of course, particles outside of the ranges set forth in the preceding sentences may also move downward.

It is beyond the scope of this invention to describe all of the factors in addition to the flow rate of the fluid that may affect whether or not particles at any given distance from the outlet screen move when particles are withdrawn from the bottom of the particle bed. For completeness, however, these other factors are believed to include the distance and orientation relative to the outlet screen of the particle outlet from the particle bed, as well as the flow rate of particles through the particle outlet. The particle discharge rate is believed to have little effect on whether or not all the particles in the bed move at once, unless the discharge rate is extremely high and initiates significant particle-particle turbulence in the bed. The particle outlet, on the other hand, is believed to have a significant effect on which particles move within the bed. In general, the shorter the horizontal distance between the opening in the particle outlet and the surface of the outlet screen, the more likely it is that particles near the outlet screen will move when particles are withdrawn through the particle outlet. Also, as particles across the entire width of the outlet screen move downward, their downward direction is preferably pointed directly into the particle outlet through which they exit the particle bed. In the case of a flat outlet screen, for example, the opening of the particle outlet is preferably horizontally extended and is as long as the outlet screen is wide. In the case of a cylindrical outlet screen the opening for the particle outlet preferably extends around the entire circumference of the outlet screen, such as is shown in U.S. Pat. No. 4,567,023, for example. Similarly, the greater the width of the opening of the particle outlet, the more likely it is that more particles in the bed will move downward when any of the particles move downward. For example, if the entire cross-sectional area of the bed at the elevation of the bottom of the outlet screen emptied into a particle outlet having the same cross-sectional area as that of the bed, then particles throughout the bed would be expected to move downward whenever the particles at the surface of the outlet screen moved downward. To the extent that the cross-sectional area of the particle outlet is reduced, areas of stagnant particles in the bed may exist, even if all the particles in the bed along the surface of the outlet screen are moving downward. More than one particle outlet opening may be used.

Generally, particles that are neither pinned nor otherwise stagnant move downward through the bed at velocities that are determined by processing requirements of the fluid-particle contacting process. These, in turn, relate to the nature of the fluid and the particles. However, velocities are typically in the range of from about 1 to 20 mm/minute, and more commonly in the range of from about 1 to about 10 mm/minute.

The velocity of the particles can be determined by measuring the distance that particles move during a given time interval. This can be done with the human eye, unaided or with the aid of magnification, or with a camera. Particle velocities as low as about 0.015 mm/min, and even lower, can be measured readily. The accuracy and precision of the velocity measurement can be improved by increasing the time interval or by increasing the magnification. Where the particles are alternately at rest for a period of time and then moving for a period of time, the velocity computed by this method is usually an average based on the distance moved and the time elapsed over several consecutive periods of movement and rest.

The average velocity of particles in the bed can also be estimated from the average residence time of particles in the bed. Average particle velocity in the bed can be determined by dividing the volumetric flow rate of particles through the bed in the downward direction by the horizontal cross-sectional area of the bed, with consistent length units for volume and area. Average particle residence time in the bed can also be determined by marking particles that are to be added to the bed and then measuring the time that elapses between when the marked particles enter the bed and when the marked particles exit the bed. Suitable marking methods depend on the function and operating conditions of the bed and on the nature of the particles themselves. But the marking method should not significantly change the flowing properties of the marked particles relative to that of the unmarked particles, in order to ensure that the flow of the marked particles through the bed is representative of that of the unmarked particles. If the particles entering and exiting the bed can be visually observed, then a simple method of marking is dyeing the particles a color different from that of the other particles. When the entering and exiting particles cannot be seen, radioisotope technology marking, which uses marked particles that are identical to the unmarked particles, except that they contain a radioisotope and they function as a tracer. Whatever the method of marking, the concentration-time profiles of the inlet pulse of marked particles entering the bed and of the outlet pulse exiting the bed can be measured using detectors (i.e., visually or radioisotopically), and the residence time of the particles in the bed can be determined. Further information on residence time studies using radioisotope tracing techniques can be obtained from Synetix Process Diagnostics, P.O. Box 1, Belasis Hall Technology, Billingham, Cleveland, TS23 1LB, United Kingdom.

While the stagnant bed pinning flow rate places a lower limit on the fluid flow rate when practicing this invention, the moving bed pinning flow rate places an upper limit on the fluid flow rate. The moving bed pinning flow rate is defined as the fluid rate that prevents at least a portion of the particles in a bed, which is initially moving, from moving downward when particles are withdrawn from the bottom of the bed. It is assumed that the configuration of the particle bed is such that, when no fluid passes through the bed and the particle outlet at the bottom of the bed is opened, at least a portion of the particles in the bed move downward and particles are withdrawn from the bottom of the bed. The flow rate of the fluid is in excess of the moving bed pinning flow rate when at least a portion of the particles that were able to move downward when no fluid passed through the bed cannot move downward when the fluid is passing through the bed. That is, but for the flow rate of the fluid being in excess of the moving bed pinning flow rate, particles in the bed that could otherwise move downward are unable to move downward.

The moving bed pinning flow rate can be determined in a manner similar to that described previously for the stagnant bed pinning flow rate. Thus, the moving bed pinning flow rate can be estimated using a theoretical analysis of the mechanics within the moving bed of particles using the analysis described in the previously-mentioned article written by J. C. Ginestra et al. The inputs to this analysis are the same as those previously listed for the stagnant bed pinning flow rate analysis, except that the "history" of the particle bed includes how the particles were loaded into the bed; whether or not the particles were stopped after loading; when and for how long the particles were stopped, if they were stopped; and how fast and for how long the particles have moved or have been moving. The moving bed pinning flow rate can also be measured by experiment using an apparatus such as that previously described for measuring the stagnant bed pinning flow rate. After establishing the particle bed with its initial conditions and its "history," and while the particle inlet and outlet are open, the fluid flow rate through the bed of particles is either started or maintained at a relatively low rate so that, while downward flow of particles takes place, none of the particles within the bed are pinned. Next, the flow rate of fluid is increased stepwise, with each increase in flow rate approaching the flow rate that causes some of the particles to be pinned, until the final upward step in flow rate results in pinning of some of the particles. The moving bed pinning flow rate can be determined by averaging the penultimate and final flow rates. The precision of the measurement of the moving bed pinning flow rate can be improved by decreasing the step size between the penultimate and final flow rates.

When practicing this invention, the fluid flow rate is preferably from about 105% to about 160%, and more commonly from about 120% to about 140%, of the stagnant bed pinning flow rate. Also, when practicing this invention, the fluid flow rate is preferably from about 50% to about 95%, and more commonly from about 60% to about 90%, of the moving bed pinning flow rate.

The fluid for use in this invention may be a liquid but is preferably a gas. The fluid may be inert with respect to the particles, may exchange heat or mass with the particles, or may be involved in reactions which occur on the particles or in the fluid. Preferably the fluid is a single phase at the operating conditions of the particle bed. Suitable fluids include inorganic gases such as air, hydrogen, water (i.e., steam), nitrogen, and oxygen; organic gases such as hydrocarbon vapors including $C_1$ to $C_{25}$ hydrocarbons, including paraffins, olefins, naphthenes, and aromatics; and mixtures of organic and inorganic gases.

This invention is applicable to a number of hydrocarbon conversion processes in which a particulate material is maintained in a vertically extended moving bed while gas flows transversely or in cross flow through the bed. Examples of these processes include, but are not limited to dehydrogenation of hydrocarbons to olefins or aromatics, reforming of naphtha, and dehydrocyclodimerization of liquid paraffin gases to naphthenes or aromatics. This invention is also applicable to processes for the regeneration or reactivation of deactivated hydrocarbon conversion catalysts. The conditions for carrying out these processes are well known in the art and are presented here for completeness.

In the case of a moving bed reaction zone, fresh catalyst particles are fed to the reaction zone, which may be comprised of several reactors, and the particles flow through each zone by gravity. The feed stream is usually preheated by any suitable heating means to the desired reaction temperature and then passed into the reaction zone containing a bed of catalyst. The reactants may be contacted with the catalyst bed in either upward, downward, or radial flow fashion. Generally, the reactants are in the vapor phase when they contact the catalyst bed. Such reaction zones are known to persons of ordinary skill in the art of hydrocarbon processing, and are described in patents such as U.S. Pat. Nos. 3,838,038; 4,040,794; 4,567,023; each of which is incorporated herein by reference. Catalyst is withdrawn from the bottom of the reaction zone and may be transported to a regeneration zone.

In the case of a moving bed regeneration zone, a multi-step regeneration process is typically used to recondition the catalyst to restore its full reaction-promoting ability. Catalyst flows by gravity through the various regeneration steps and then is withdrawn from the regeneration zone and furnished to the reaction zone. Multi-step regeneration zones are know to persons of ordinary skill in the art of hydrocarbon catalyst regeneration, and are described in patents such as U.S. Pat. Nos. 3,652,231; 5,001,095; 5,053,371; and 5,227,566; each of which is incorporated herein by reference.

Movement of catalyst through the reaction or regeneration zone is preferably continuous though, in practice, it may be semi-continuous. By semi-continuous movement is meant the repeated transfer of relatively small amounts of catalyst at closely spaced points in time. For example, one batch per minute may be withdrawn from the bottom of a zone and withdrawal may take one-half minute; that is catalyst will flow for one-half minute. The duration of time between the end of the withdrawal of one batch and the start of the withdrawal of the next batch is sufficiently short to prevent pinning of the catalyst in the zone. If the inventory in the reaction or regeneration zone is large in relation to the batch size, the catalyst bed may be considered to be continuously moving. Suitable catalyst movement systems are known to persons of ordinary skill in the art of hydrocarbon processing, and are described in patents such as U.S. Pat. Nos. 5,338,440 and 5,500,110, each of which is incorporated herein by reference. Typically, the rate of catalyst movement through the catalyst beds may range from as little as 200 pounds (90.7 kg) per hour to 4500 pounds (2041 kg) per hour, or more.

In the dehydrogenation of hydrocarbons, the feed stream to the dehydrogenation reaction zone usually consists of a combination of fresh paraffins, a diluent material, and recycled unconverted hydrocarbons. Hydrocarbons which can be dehydrogenated include hydrocarbons having from 2 to 30 or more carbon atoms per molecule, including normal paraffins, isoparaffins, alkylaromatics, naphthenes, and olefins, but the hydrocarbons used are typically normal paraffins having from 3 to 22 carbon atoms per molecule. The diluent material may be hydrogen, steam, methane, ethane, carbon dioxide, nitrogen, argon, or the like, or a mixture thereof, but hydrogen is the most common diluent. When hydrogen is used as the diluent, it is used in amounts sufficient to ensure a hydrogen to hydrocarbon mole ratio of ordinarily from about 0.1:1 to about 40:1, and more commonly from about 1:1 to about 10:1 in the reaction zone.

In dehydrogenation, the feed stream is heated and the bed of catalyst is maintained at proper dehydrogenation conditions of temperature and pressure before the feed stream is passed to the reaction zone. Process details for combining and heating the feed stream are well known to persons having ordinary skill in the art. The reactants entering the bed are in vapor phase condition. The pressure in the dehydrogenation zone is maintained as low as practicable, consistent with equipment limitations. The process may use one or more reaction subzones with heating means there between to ensure that the desired reaction temperature can be maintained at the inlet to each reaction subzone. Additional diluent may be added into, or combined with the effluent of, any or all of the reaction subzones. Reaction conditions for the dehydrogenation of paraffins include a temperature of from about 752 to about 1652° F. (400° C. to 900° C.), a pressure of from about 0.15 to about 147 psi(g) (1 to 1013 kPa(g)), and a LHSV of from about 0.1 to about 100 $hr^{-1}$. As used herein, the abbreviation 'LHSV' means liquid hourly space velocity, which is defined as the volumetric flow rate of liquid per hour divided by the catalyst volume, where the liquid volume and the catalyst volume are in the same volumetric units. Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 wt-ppm of the hydrocarbon feed stream. About 1 to about 10,000 wt-ppm of water addition gives best results when dehydrogenating paraffins having from 2 to 30 or more carbon atoms.

Dehydrogenation catalysts that meet commercial standards for activity, stability, selectivity, and physical strength (i.e., attrition resistance) are believed to be suitable for use in the subject invention. Dehydrogenation catalysts are described in U.S. Pat. Nos. 3,274,287; 3,315,007; 3,315,008; 3,745,112; 4,430,517; and 6,177,381, each of which is incorporated by reference in its entirety. Typically, these catalysts are comprised of a platinum group component supported on a porous carrier material. The typical carrier material is a refractory inorganic oxide such as gamma-alumina. Usually, dehydrogenation catalysts contain on an elemental basis 0.01 to 2 wt-% platinum group component and about 0.1 to 5 wt-% of an alkali or alkaline earth metal. Often, there is present 0.05 to 1 wt-% platinum group component and about 0.25 to 3.5 wt-% of the alkali or alkaline earth component. The platinum group component may be chosen from the group consisting of platinum, palladium, rhodium, ruthenium, osmium, and iridium, but platinum is highly preferred. The alkali or alkaline earth component may be selected from the group consisting of the alkali metals—cesium, rubidium, potassium, sodium, and lithium; and the alkaline earth metals—calcium, strontium, barium, and magnesium. This component is usually either lithium or potassium. Another example of a suitable dehydrogenation catalyst is a catalyst which in addition to the previously described platinum and alkali or alkaline earth metal components contains a tin component. This catalytic composite would contain from about 0.1 to about 1 wt-% tin. Yet another catalytic composite which should be highly suited for use in the subject process comprises an indium component in addition to the platinum, tin, and alkali or alkaline earth components. The indium component may be present on an elemental basis equal to about 0.1 to about 1 wt-% of the final composite. It is also known in the art that some catalytic composites of this nature may benefit from the presence of a small amount of a halogen component, with chlorine being the normally preferred halogen. Typical halogen concentrations in the final catalytic composite range from about 0.1 to about 1.5 wt-%. A halogen component is not desired in all situations. Layered composition comprising an inner core such as alpha alumina, and an outer layer, comprising an outer refractory inorganic oxide, bonded to the inner core are also suitable. These catalytic composites are known to those skilled in the art and are described in the available references.

The effluent from the dehydrogenation reaction zone typically undergoes treatment for the separation of hydrogen by condensing the heavier hydrocarbons into a liquid-phase stream and the recovery of hydrogen and light hydrocarbon gas. This gas can be recycled to the reaction zone and thereby supply the hydrogen diluent that is combined with the fresh and recycled hydrocarbons. Generally, the hydrocarbon-rich liquid phase is further separated by means of either a suitable selective adsorbent, a selective solvent, or a selective reaction or reactions, or by means of a suitable fractionation scheme. Unconverted dehydrogenatable hydrocarbons are recovered and may be recycled to the reaction zone. Products of the dehydrogenation reactions are recovered as final products or as intermediate products in the preparation of other compounds. Process details for the recovery and separation of products from the effluent are well known to persons of ordinary skill in the art.

Catalytic reforming is used to improve the octane quality of hydrocarbon feedstocks, the primary product of reforming being motor gasoline. A feedstock is admixed with a recycle stream comprising hydrogen and contacted with catalyst in a reaction zone. The usual feedstock for catalytic reforming is a petroleum fraction known as naphtha and having an initial boiling point of about 180° F. (82° C.) and an end boiling point of about 400° F. (204° C.). Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions. Further information on reforming processes may be found in, for example, U.S. Pat. Nos. 4,119,526; 4,409,095; and 4,440,626.

The reforming reaction zone may comprise one or more reactors with suitable means between reactors if any to reheat each reactor's effluent and to assure that the desired temperature is maintained at the entrance to each reactor. The reforming reaction zone is operated at reforming conditions to achieve the desired reformate product quality. Reforming conditions include a range of pressures generally from atmospheric pressure (0 psi(g)) to 1000 psi(g) (0 to 6895 kPa(g)), and more commonly from about 40 to about 200 psi(g) (276 to 1379 kPa(g)). The overall LHSV based on the total catalyst volume in the reaction zone including all reactors is generally from 0.1 to 10 $hr^-$, and more commonly from about 1 to about 5 $hr^-$. Hydrogen is supplied to provide an amount of generally from about 1 to about 20, and more commonly less than about 3.5, moles of hydrogen per mole of hydrocarbon feedstock entering the reaction zone. Water or a material which decomposes at reforming conditions to form water such as an alcohol may be added to the reaction zone, either continuously or intermittently, in an amount to provide, calculated on the basis of equivalent water, about 1 to about 1,000 wt-ppm of the hydrocarbon feed stream. A hydrogen halide such as hydrogen chloride, or a material which decomposes at reforming conditions to form a hydrogen halide, such as an organic chloride, may also be added to the reaction zone in a similar manner, except in an amount to provide, calculated on the basis of equivalent halide, about 0.5 to 1,000 wt-ppm of the hydrocarbon feed stream.

Catalytic reforming reactions are normally effected in the presence of catalyst particles comprised of one or more IUPAC Groups 8–10 (Group VIIIA) noble metals (e.g., platinum, iridium, rhodium, palladium) and a halogen combined with a porous carrier such as a refractory inorganic oxide. The halogen is normally chlorine. Alumina is a commonly used carrier. The preferred alumina materials are gamma, eta, and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about $1/16^{th}$ to about $1/8^{th}$ in (1.6–3.1 mm), though they may be as large as $1/4^{th}$ in (6.3 mm). In a particular regenerator, however, it is desirable to use catalyst particles which fall in a relatively narrow size range. A preferred catalyst particle diameter is $1/16^{th}$ in (1.6 mm). Examples of reforming catalysts that are suitable for use in moving bed processes are described in U.S. Pat. No. 5,858, 205, which is incorporated herein by reference, and in the references cited therein.

Feed streams to dehydrocyclodimerization processes include saturated or unsaturated $C_2$–$C_6$ aliphatic hydrocarbons, such as isobutane, normal butane, isobutene, normal butene, propane and propylene. Diluents such as hydrogen or nitrogen may be in the feed stream. Dehydrocyclodimerization conditions for the dehydrocyclodimerization of $C_2$–$C_6$ aliphatic hydrocarbons to aromatics include a temperature of from about 662 to about 1202° F. (350 to 650° C.), a pressure of from about 0 to about 300 psi(g) (0 to 2068 kPa(g)), and a LHSV of from about 0.2 to about 5 hr⁻. Typical process conditions are a temperature in the range from about 752° F. to about 1112° F. (400 to 600° C.), a pressure in or about the range from about 0 to about 150 psi(g) (0 to 1034 kPa(g)), and a LHSV of between 0.5 to 3.0 hr⁻. Processes for the dehydrocyclodimerization of aliphatic hydrocarbons containing from 2 to 6 carbon atoms per molecule to produce a high yield of aromatics and hydrogen are well known to persons having ordinary skill in the art. Such processes are described in U.S. Pat. Nos. 4,654,455 and 4,746,763, which are incorporated herein by reference.

Suitable dehydrocyclodimerization catalysts include those that contain a phosphorus modified alumina (aluminum phosphate) as a binder in addition to a zeolite and a gallium component. The zeolites which may be used are any of those which have a molar ratio of silicon per aluminum of greater than about 10 and a pore diameter of about 5 to 6 Angstroms. Specific examples of zeolites which can be used are the well-known ZSM family of zeolites, which includes ZSM-5, ZSM-8, ZSM-11, ZSM-12, and ZSM-35. The amount of zeolite present in the catalyst is usually from about 30 to about 90 weight percent of the catalyst. The phosphorous can be incorporated with the alumina in any acceptable manner known in the art, such as the gellation of a hydrosol of alumina which contains a phosphorus compound using the well-known oil-drop method. The relative amount of aluminum and phosphorus expressed in molar ratios of aluminum per phosphorus ranges from about 1:1 to 1:100 on an elemental basis. The gallium component is deposited onto the support in a manner which results in a uniform dispersion of the gallium, such as by impregnating the support with a salt of the gallium metal. The amount of gallium which is deposited onto the support varies from about 0.1 to about 5 weight percent of the finished catalyst expressed as the metal. Further details of preparing and one method of preparing suitable dehydrocyclodimerization catalysts are described in U.S. Pat. No. 4,692,717, the teachings of which are incorporated herein by reference.

It is common in the practice of dehydrogenation, reforming, and dehydrocyclodimerization reactions for the catalyst particles to become deactivated as a result of mechanisms such as the deposition of coke on the particles. That is, after a period of time in use, the ability of catalyst particles to promote reactions decreases to the point that the catalyst is no longer useful. The catalyst must be reconditioned, or regenerated, before it can be reused in the process. Thus, it is common to remove catalyst from the bottom of a reactor in the reaction zone, regenerate it by conventional means known to the art, and then return it to the top of that reactor or another reactor in the reaction zone.

Three common examples of catalyst regeneration steps that can be performed by circulating a recycle gas transversely through a down-flowing catalyst bed are combustion of coke deposits on the catalyst, redispersion of metal on the catalyst, and reestablishing a desired halide (i.e., chloride) level on the catalyst. These are well-known steps and are described in U.S. Pat. Nos. 5,151,392; 5,457,077; and 6,153, 091; each of which is incorporated herein by reference, and in the references cited therein. The following operating conditions are typical for regenerating reforming catalyst, but are not meant to exclude other catalysts or their regeneration conditions. In coke combustion, the recycle gas stream typically contains a low concentration of oxygen (i.e., from about 0.5 to about 1.5 vol-%) passes through the catalyst. The coke is usually oxidized at temperatures ranging from about 900 to about 1000° F. (482 to 538° C.), but temperatures in localized regions may reach about 1100° F. (593° C.) or more. In addition to oxygen, the recycle gas also typically contains water and halogen-containing compounds, but the balance of the recycle gas is mostly nitrogen and carbon oxides. In metal redispersion, the recycle gas generally contains a higher concentration of oxygen (usually from about 2 to about 21 vol-%) and a lower concentration of water than used for coke combustion. The recycle gas also generally contains either molecular chlorine or another chlorine-containing molecule that can be converted in the regeneration zone to chlorine. The concentration of molecular chlorine that promotes rapid and complete redispersion of the platinum metal depends on the amount of metal to be redispersed, but is usually on the order of from about 0.01 to about 0.2 mol-% of the gas in the redispersion zone. The redispersion zone is maintained at conditions that favor an equilibrium shift towards molecular chlorine. The recycle gas contacts the catalyst at a temperature between about 800 and about 1100° F. (427 to 593° C.) and temperatures within the redispersion zone are usually in a range of from about 950 to about 1000° F. (510 to 538° C.). In rehaliding, the recycle gas must contain a halogen-containing molecule that is suitable for adding halide to the catalyst, such as hydrogen chloride when the halide is chloride. The concentration of halogen-containing compounds in the recycle gas depends on many factors, including the hydroxyl content of the catalyst and the desired amount of halide to be added to the catalyst. The recycle gas may contain 1.0 to 10 mol-% oxygen, but this concentration depends on many factors including the composition of the catalyst and the concentration of oxygen needed to decompose the halogen-containing molecule and/or to deposit halide (e.g., chloride) on the catalyst. Typically the rehaliding zone will have a temperature of from about 400 to about 1000° F. (204 to 538° C.).

The following examples are illustrative of the invention and are only intended to illustrate the invention. It is not intended that these examples limit the scope of the invention as set forth in the claims.

EXAMPLES

In these examples, particulate material comprising spherical alumina particles having a diameter of $1/16$ in (1.6 mm) was used. A model of the longitudinal section of a vertically-oriented cylindrical vessel that provides for horizontal, radially-inward air flow and vertically-downward particle flow was used. The model contains a larger diameter inlet screen and a smaller diameter outlet screen with a space between the screens for a particle bed. The model has an air inlet for delivering compressed ambient air to the inlet screen, an air outlet for withdrawing air exiting the outlet screen, a particle inlet for supplying particles to the top of the bed, and a particle outlet for withdrawing particles from the bottom of the bed. The sizes and locations of the particle inlets and outlets in relation to the particle bed were the same in Examples 1–13. The sizes and locations of the particle inlets and outlets in relation to the particle bed were the same in Examples 14–18. Within the model, the temperature was ambient and the pressure was less than 1 psi (6.9 kPa) above atmospheric pressure. All air velocities are superficial velocities and are computed at standard conditions of 60° F. (15.6° C.) and one atmosphere, and the superficial velocities are computed at the outlet screen cross-sectional area.

Example 1 (Comparative)

At the start of Example 1, the particle bed was full of particles, the particle outlet was closed, and the particle bed had been stagnant for about 2 days. Then, the air inlet was opened, and an air velocity of 5.1 ft/s (1.6 m/s) through the bed was maintained. Then, the particle inlet and outlet were opened to start the downward flow of particles. At a certain elevation from the bottom of the bed, downward particle velocity was measured visually as a function of horizontal (transverse) distance from the outlet screen, at distances of 1.5%, 4.2%, and 8.3% of the distance from the outlet screen to the inlet screen. The movement of particles is shown in Table 1. An "O" in Table 1 indicates a downward particle velocity of less than 0.2 mm/min, which was the lower limit of measurable particle velocity using the unaided human eye. That is, for purposes of these examples, particles having a downward velocity of less than 0.2 mm/min were deemed to be pinned. An "X" in Table 1 indicates a downward particle velocity of more than 0.2 mm/min. Referring to Table 1, particles near to the outlet screen, that is within about 1.5% of the distance from the outlet screen to the inlet screen, were pinned. Example 1 indicates that the stagnant bed pinning flow rate for the bed corresponds to a velocity of less than 5.1 ft/s (1.6 m/s).

Example 2 (Comparative)

About 15 minutes after the start of Example 1 and after the particle velocities were measured in Example 1, the air inlet was closed while the particle inlet and outlet were kept open so that particles flowed downward through the particle bed. The downward particle velocity was measured at the same elevation and in the same manner as in Example 1, and the movement of particles is shown in Table 1, which shows that none of the particles were pinned.

Example 3

About 15 minutes after the start of Example 2 and after the particle velocities were measured in Example 2, the air inlet was re-opened while the particle inlet and outlet were kept open so that particles flowed downward through the particle bed. An air velocity of 5.1 ft/s (1.6 m/s) through the bed was maintained. The downward particle velocity was measured at the same elevation and in the same manner as in Example 1, and the movement of particles is shown in Table 1, which shows that none of the particles were pinned, even though the air velocity was the same as that in Example 1.

Example 4

About 15 minutes after the start of Example 3 and after the particle velocities were measured in Example 3, the air inlet was opened further while the particle inlet and outlet were kept open so that particles flowed downward through the particle bed. An air velocity of 5.5 ft/s (1.7 m/s) through the bed was maintained. The downward particle velocity was measured at the same elevation and in the same manner as in Example 1, and the movement of particles is shown in Table 1, which shows that none of the particles were pinned, even though the air velocity was even more than that in Example 1.

Example 5

About 15 minutes after the start of Example 4 and after the particle velocities were measured in Example 4, the air inlet was opened further while the particle inlet and outlet were kept open so that particles flowed downward through the particle bed. An air velocity of 5.9 ft/s (1.8 m/s) through the bed was maintained. The downward particle velocity was measured at the same elevation and in the same manner as in Example 1, and the movement of particles is shown in Table 1, which shows that particles were pinned only to the same extent as in Example 1, even though the air velocity was 16% greater than that in Example 1.

Examples 4 and 5 show that, after the particle bed was moving and none of the particles were pinned, pinning at the specified elevation occurred when the velocity was increased up to the range of from about 5.5 to about 5.9 ft/s (1.7 to 1.8 m/s) Thus, Examples 4 and 5 indicate that the moving bed pinning flow rate for the bed corresponds to a velocity in the range of from about 5.5 to about 5.9 ft/s (1.7 to 1.8 m/s). By contrast, Example 1 shows that, with the bed initially stagnant, a velocity of about 5.1 ft/s (1.6 m/s) was sufficient to pin some of the particles at the specified elevation. Thus, this invention allows for the velocity to be increased by at least 0.4 ft/s (0.1 m/s), or by at least 7.8%, without causing pinning to occur.

Example 6

About 15 minutes after the start of Example 5 and after the particle velocities were measured in Example 5, the air inlet was opened further while the particle inlet and outlet were kept open so that particles flowed downward through the particle bed. An air velocity of 6.5 ft/s (2.0 m/s) through the bed was maintained. The downward particle velocity was measured at the same elevation and in the same manner as in Example 1, and the movement of particles is shown in Table 1, which shows that particles were pinned to a greater extent than that in Example 5.

Example 7

About 15 minutes after the start of Example 6 and after the particle velocities were measured in Example 6, the air inlet was closed slightly while the particle inlet and outlet were kept open so that particles flowed downward through the particle bed. An air velocity of 5.6 ft/s (1.7 m/s) through the bed was maintained. The downward particle velocity was measured at the same elevation and in the same manner as in Example 1, and the movement of particles is shown in Table 1, which shows that the particles were pinned to a greater extent than in Example 4.

A comparison of Examples 4 and 7 shows the effect of the pinning of the particles that occurred in Examples 5 and 6. Although both Examples 4 and 7 were conducted at approximately the same air velocity, the particles were pinned to a much greater extent in Example 7 than in Example 4. It is believed that the additional catalyst that was pinned in Examples 5 and 6 was not unpinned by merely decreasing the air velocity to approximately that of Example 4.

Example 8 (Comparative)

At the start of Example 8, the particle bed was full of particles, the particle outlet was closed, and the particle bed had been stagnant for 91 days. Then, the air inlet was opened, and an air flow through the bed was initiated at a rate that would be sufficient to pin some of the particles in the bed at a specified elevation within the bed when the particle inlet and outlet were opened to start the downward flow of particles. Then, the particle inlet and outlet were opened to start the downward flow of particles and the air flow rate was maintained constant for about 15 minutes. Then the air flow rate was decreased to a lower rate in order to unpin some of the pinned particles, and the new flow rate was maintained for about 15 minutes. The air flow rate was decreased step-wise six more times, each of which unpinned more of the pinned particles, with a 15-minute hold at each new flow rate prior to the next step-down in flow rate. After the last step-down in air flow rate, none of the particles at the specified elevation were pinned. The air velocities at the penultimate and final steps in flow rate were about 2.6 ft/s (0.79 m/s) and about 1.9 ft/s (0.58 m/s), respectively.

Example 9

After a 15-minute hold following the last step-down in air flow rate in Example 8, the air flow rate was increased to a velocity of about 3.8 ft/s (1.2 m/s) and maintained at that flow rate for about 15 minutes. None of the particles at the specified elevation were pinned. Then, the air flow rate was increased to a velocity of about 4.4 ft/s (1.3 m/s) and maintained at that flow rate for about 15 minutes. Some of the particles in the bed at the specified elevation pinned.

Example 9 shows that, after the particle bed was moving and none of the particles were pinned, pinning at the specified elevation occurred when the velocity was increased up to the range of from about 3.8 ft/s (1.2 m/s) to about 4.4 ft/s (1.3 m/s), which corresponds to the moving bed pinning flow rate. By contrast, Example 8 shows that, with the bed initially stagnant, a velocity in the range of from about 1.9 ft/s (0.58 m/s) to about 2.6 ft/s (0.79 m/s) was sufficient to pin some of the particles at the specified elevation, and this range of velocities corresponds to the stagnant bed pinning flow rate. Examples 8 and 9 show that the velocity can be increased by from about 1.2 ft/s (0.37 m/s) to about 2.5 ft/s (0.76 m/s), or by from about 46% to about 132%, without causing pinning to occur. The difference between the moving bed pinning flow rate determined in Example 9 and that determined in Examples 4 and 5 is believed to be due in part to the longer stagnant period prior to the start of Example 8 compared to that prior to the start of Example 1, and also to a greater extent of pinning in the bed in Example 8 compared to that in Example 1. Thus, Examples 8 and 9 show that a moving bed pinning flow rate that is significantly greater than the stagnant bed pinning flow rate can be achieved, even though, unlike Example 2, the air flow rate in Example 8 was not decreased to zero. Because the air flow rate in Example 2 was decreased to zero, it follows that the air flow rate was decreased to a flow rate of 0% of the stagnant bed pinning flow rate in Example 2. In contrast, since the air flow rate in Example 8 was decreased to a rate corresponding to a velocity of 1.9 ft/s (0.58 m/s) and since the stagnant bed pinning flow rate in Example 8 was determined to correspond to velocities in the range of from about 1.9 ft/s (0.58 m/s) to about 2.6 ft/s (0.79 m/s), then the air flow rate in Example 8 was decreased to a flow rate of from about 73% to about 100% of the stagnant bed pinning flow rate. Therefore, even though the air flow rate in Example 8 was not decreased to zero or a low percentage of the stagnant bed pinning flow rate, nevertheless the moving bed pinning flow rate in Example 9 is significantly greater than the stagnant bed pinning flow rate in Example 8.

Example 10 (Comparative)

Example 10 was essentially a repeat of Example 8, except that the particle bed had been reloaded about 1 day prior to the start of Example 10, the air flow rate was decreased step-wise five more times instead of six more times, and the air velocities at the penultimate and final steps in flow rate were about 3.6 ft/s (1.1 m/s) and about 2.6 ft/s (0.79 m/s), respectively, instead of about 2.6 ft/s (0.79 m/s) and about 1.9 ft/s (0.58 m/s), respectively.

A comparison of Examples 8 and 10 shows that as the time period that the particle bed lay stagnant increased, the susceptibility of the bed to pin also increased. In Example 10, the particle bed had been reloaded previously by only about 1 day, and at the specified elevation the particles did not become entirely unpinned until the air velocity had been decreased to the range of from about 2.6 ft/s (0.79 m/s) to about 3.6 ft/s (1.1 m/s). By contrast, in Example 8, the particle bed had been stagnant for 91 days, and at the specified elevation the particles did not become entirely unpinned until the air velocity had been decreased to the range of from about 1.9 ft/s (0.58 m/s) to about 2.6 ft/s (0.79 m/s). Thus, as the time period during which the bed lay stagnant increased, the amount of reduction in air velocity to unpin the bed at the specified elevation also increased, which indicates that the particles at the specified elevation of the bed were more susceptible to pinning in Example 8 than in Example 10. This conclusion is confirmed by observations of the beds in Examples 8 and 10 while the air velocities were being decreased step-wise. To illustrate, at an air velocity of 3.4–3.6 ft/s (1.0–1.1 m/s) and at the specified elevation of the bed, particles within about 25% of the inter-screen distance from the outlet screen were pinned in Example 10 while particles within about 46% of the inter-screen distance were pinned in Example 8. Thus, at essentially the same air velocity, the bed that had been stagnant for 91 days was about 80% more pinned than the bed that had been reloaded only 1 day previously.

Example 11

Example 11 was similar to Example 9. After a 15 minute hold following the last step-down in air flow rate in Example 10, the air flow rate was increased and maintained at a new flow rate for about 15 minutes. None of the particles at the specified elevation were pinned. The air flow rate was increased again to a velocity of about 4.6 ft/s (1.4 m/s) and maintained at that flow rate for 15 minutes. None of the particles at the specified elevation were pinned. Then, the air flow rate was increased to a velocity of about 5.4 ft/s (1.6 m/s) and maintained at that flow rate for about 15 minutes. Some of the particles in the bed at the specified elevation pinned.

Example 11 shows that, after the particle bed was moving and none of the particles were pinned, pinning at the specified elevation occurred when the velocity was increased up to the range of from about 4.6 ft/s (1.4 m/s) to about 5.4 ft/s (1.6 m/s), which corresponds to the moving bed pinning flow rate. By contrast, Example 10 shows that, with the bed initially stagnant, a velocity in the range of from about 2.6 ft/s (0.79 m/s) to about 3.6 ft/s (1.1 m/s) was sufficient to pin some of the particles at the specified elevation, and this range of velocities corresponds to the stagnant bed pinning flow rate. Examples 10 and 11 thus show that the velocity can be increased by from about 1.0 ft/s (0.30 m/s) to about 2.8 ft/s (0.85 m/s), or by from about 28% to about 108%, without causing pinning to occur. The difference between the moving bed pinning flow rate determined in Example 11 and that determined in Example 9 is believed to be due in part to the shorter stagnant period prior to the start of Example 10 compared to that prior to the start of Example 8. Thus, Examples 10 and 11 show that a moving bed pinning flow rate that is significantly greater than the stagnant bed pinning flow rate can be achieved, even though, like in Example 8, the flow rate in Example 10 was not decreased to zero. Since in Example 10 the air flow rate was decreased to a rate corresponding to a velocity of 2.6 ft/s (0.79 m/s) and the stagnant bed pinning flow rate was determined to correspond to velocities in the range of from about 2.6 ft/s (0.79 m/s) to about 3.6 ft/s (1.1 m/s), then the air flow rate in Example 10 was decreased to a flow rate of from about 72% to about 100% of the stagnant bed pinning flow rate. Therefore, despite the fact that the flow rate of air in Example 10 was not decreased to zero or to a very low rate, the moving bed pinning flow rate in Example 11 is significantly greater than the stagnant bed pinning flow rate in Example 10.

Example 12

At the start of Example 12, the particle bed was full of particles, the particle outlet was closed, and the particle bed had been stagnant for about 5 days. Then, the particle inlet and outlet were opened to start the downward flow of particles. Then, the air inlet was opened, and an air velocity of 5.6 ft/s (1.7 m/s) through the bed was maintained. The downward particle velocity was measured at the same elevation and in the same manner as in Example 1, and the movement of particles is shown in Table 1, which shows that none of the particles were pinned.

Example 12 illustrates starting the downward flow of particles prior to starting the flow of air, in contrast to Example 1 where the downward flow of particles was begun after the flow of air was started.

Example 13

About 15 minutes after the start of Example 12 and after the particle velocities were measured in Example 12, the air inlet was opened further while the particle inlet and outlet were kept open so that particles flowed downward through the particle bed. An air velocity of 6.5 ft/s (2.0 m/s) through the bed was maintained. The downward particle velocity was measured at the same elevation and in the same manner as in Example 1, and the movement of particles is shown in Table 1, which shows that particles were pinned to a greater extent than in Example 12.

Examples 12 and 13 indicate a range for the moving bed pinning flow rate of between about 5.6 ft/s (1.7 m/s) and 6.5 ft/s (2.0 m/s) for a bed that had been stagnant for about 5 days. This range overlaps the range for the moving bed pinning flow rate that is indicated by Examples 4 and 5 of between about 5.5 ft/s (1.7 m/s) and 5.9 ft/s (1.9 m/s). Therefore, a comparison of Examples 12 and 13 on the one hand with Examples 4 and 5 on the other hand indicates that the same, or nearly the same, moving bed pinning flow rate is attained in a bed of non-pinned particles whether the particles in the bed had previously been pinned and then unpinned as in Examples 1 to 5 or merely stagnant for about 5 days as in Examples 12 and 13.

Example 14

At the start of Example 14, the particle bed was full of particles, the outlet was closed, and the particle bed had been stagnant for about 30 days. Then, the particle inlet and outlet were opened to start the downward flow of particles. Then, the air inlet was opened, and an air velocity of 4.1 ft/s (1.2 m/s) through the bed was maintained. The downward particle velocity profile was measured at the same elevation and in the same manner as in Example 1, and the movement of particles is shown in Table 1, which shows that none of the particles were pinned. Thus, the air velocity of 4.1 ft/s (1.2 m/s) corresponds to a flow rate of air that is less than the moving bed pinning flow rate.

Example 15

About 10 minutes after the start of Example 14 and after the particle velocities were measured in Example 14, the particle outlet was closed for 30 seconds so that particles stopped flowing downward through the particle bed, and then the particle outlet was reopened. An air velocity of 4.1 ft/s (1.2 m/s) through the bed was maintained. About 3–5 minutes after the particle outlet was re-opened, the downward particle velocity profile was measured at the same elevation and in the same manner as in Example 1, and the movement of particles is shown in Table 1, which shows that none of the particles were pinned.

Example 16

About 10 minutes after the start of Example 15 and after the particle velocities were measured in Example 15, the particle outlet was closed for 5 minutes so that particles stopped flowing downward through the particle bed, and then the particle outlet was reopened. An air velocity of 4.1 ft/s (1.2 m/s) through the bed was maintained. About 3–5 minutes after the particle outlet was re-opened, the downward particle velocity profile was measured at the same elevation and in the same manner as in Example 1, and the movement of particles is shown in Table 1, which shows that none of the particles were pinned.

Example 17

About 10 minutes after the start of Example 16 and after the particle velocities were measured in Example 16, the particle outlet was closed for 25 minutes so that particles stopped flowing downward through the particle bed, and then the particle outlet was re-opened. An air velocity of 4.1 ft/s (1.2 m/s) through the bed was maintained. About 3–5 minutes after the particle outlet was re-opened, the downward particle velocity profile was observed at the same elevation and in the same manner as in Example 1, and the movement of particles is shown in Table 1, which shows that none of the particles were pinned.

Example 18

About 5 minutes after the start of Example 17 and after the particle velocities were observed in Example 17, the particle outlet was closed for 30 minutes so that particles stopped flowing downward through the particle bed, and then the particle outlet was re-opened. An air velocity of 4.1 ft/s (1.2 m/s) through the bed was maintained. About 3–5 minutes after the particle outlet was re-opened, the downward particle velocity profile was measured at the same elevation and in the same manner as in Example 1, and the movement of particles is shown in Table 1, which shows that particles were pinned to a greater extent than in Example 17.

Examples 14–18 illustrate that the particle bed can be temporarily prevented from moving for a period of time up to about between 25 and 30 minutes without causing pinning to occur when particle movement is resumed.

TABLE 1

| Example No. | 1 | 2 | 3 | 4 | 5 | 6 | 7 | 12 | 13 | 14 | 15 | 16 | 17 | 18 |
|---|---|---|---|---|---|---|---|---|---|---|---|---|---|---|
| Gas velocity, ft/s | 5.1 | 0 | 5.1 | 5.5 | 5.9 | 6.5 | 5.6 | 5.6 | 6.5 | 4.1 | 4.1 | 4.1 | 4.1 | 4.1 |
| (m/s) | (1.6) | (0) | (1.6) | (1.7) | (1.8) | (2.0) | (1.7) | (1.7) | (2.0) | (1.2) | (1.2) | (1.2) | (1.2) | (1.2) |
| Relative particle flow rate through particle outlet | 1.8 | 1.0 | 1.8 | 2.0 | 2.1 | 2.3 | 2.0 | 2.0 | 2.3 | 1.5 | 1.5 | 1.5 | 1.5 | 1.5 |
| Particles at distance from outlet screen (% of interscreen distance) | | | | | | | | | | | | | | |
| 1.5% | ○ | X | X | X | ○ | ○ | ○ | X | ○ | X | X | X | X | ○ |
| 4.2% | X | X | X | X | X | ○ | ○ | X | ○ | X | X | X | X | X |
| 8.3% | X | X | X | X | X | ○ | ○ | X | ○ | X | X | X | X | X |

What is claimed is:

1. A process for passing a fluid through a bed of particulate material, the process comprising:
   a) maintaining particulate material in a vertically extended bed having a fluid inlet face, wherein the bed is maintained between the fluid inlet face and an outlet partition having a perforated section extending over at least part of its length, wherein the size of the perforations retains the particulate material while permitting fluid flow therethrough;
   b) withdrawing the particulate material from the bottom of the bed;
   c) passing an inlet fluid to the fluid inlet face and transversely through the bed; and
   d) recovering an outlet fluid from the perforated section of the outlet partition at an operating flow rate that is not less than a stagnant bed pinning flow rate.

2. The process of claim 1 further characterized in that the particulate material passes through the bed at a downward particulate velocity of more than 0.02 mm/min.

3. The process of claim 2 wherein the downward particulate velocity is more than 0.2 mm/min.

4. The process of claim 1 further characterized in that the fluid inlet face and the outlet partition are separated by a distance and that particulate material located within 10% of the distance, as measured from the outlet partition, moves at a downward particulate velocity of more than 0.02 mm/min.

5. The process of claim 4 wherein the particulate material within 1% of the inter-partition distance moves at a downward particulate velocity of more than 0.02 mm/min.

6. The process of claim 4 wherein the particulate material within 10% of the inter-partition distance moves at a downward particulate velocity of more than 0.2 mm/min.

7. The process of claim 1 further characterized in that the operating flow rate of the outlet fluid is less than a moving bed pinning flow rate.

8. The process of claim 1 wherein the inlet fluid comprises a reactant mixture and the particulate material comprises a catalyst.

9. The process of claim 1 wherein the inlet fluid comprises a gas.

10. A process for passing a fluid through a bed of particulate material, the process comprising:
    a) maintaining particulate material in a vertically extended bed between an inlet partition having a perforated section extending over at least part of its length and an outlet partition having a perforated section extending over at least part of its length wherein the size of the perforations retains the particulate material while permitting fluid flow therethrough;
    b) withdrawing the particulate material from the bottom of the bed;
    c) passing an inlet fluid transversely into the bed through the perforated section of the inlet partition; and
    d) recovering an outlet fluid from the perforated section of the outlet partition at an operating flow rate that is not less than a stagnant bed pinning flow rate.

11. The process of claim 10 further characterized in that the operating flow rate of the outlet fluid is less than a moving bed pinning flow rate.

12. A process for passing a fluid through a bed of particulate material, said process comprising:
    a) maintaining particulate material in a vertically extended bed having a fluid inlet face, wherein the bed is maintained between the fluid inlet face and an outlet partition having a perforated section extending over at least part of its length, wherein the size of the perforations retains the particulate material while permitting fluid flow therethrough;
    b) withdrawing the particulate material from the bottom of the bed and preventing the particulate material in the bed from being at rest for a period of time of more than 72 hr;
    c) passing an inlet fluid to the fluid inlet face and transversely through the bed; and
    d) recovering an outlet fluid from the perforated section of the outlet partition at an operating flow rate that is not less than a stagnant bed pinning flow rate.

13. The process of claim 12 wherein the particulate material in the bed is prevented from being at rest for a period of time of more than 1 hr.

14. The process of claim 13 wherein the particulate material in the bed is prevented from being at rest for a period of time of more than 5 min.

15. The process of claim 12 further characterized in that the bed has a solid fraction of the particulate material and that during the period of time the solid fraction increases by less than 0.04.

16. The process of claim 15 wherein the solid fraction increases by less than 0.02.

17. The process of claim 12 further characterized in that the operating flow rate of the outlet fluid is less than a moving bed pinning flow rate.

18. The process of claim 12 wherein the inlet fluid comprises a gas.

* * * * *